(12) United States Patent
Goree et al.

(10) Patent No.: US 8,913,134 B2
(45) Date of Patent: Dec. 16, 2014

(54) INITIALIZING AN INERTIAL SENSOR USING SOFT CONSTRAINTS AND PENALTY FUNCTIONS

(71) Applicant: Blast Motion, Inc., Burlingame, CA (US)

(72) Inventors: John Goree, San Diego, CA (US); Bhaskar Bose, San Diego, CA (US); Piyush Gupta, San Diego, CA (US)

(73) Assignee: Blast Motion Inc., Burlingame, CA (US)

( * ) Notice: Subject to any disclaimer, the term of this patent is extended or adjusted under 35 U.S.C. 154(b) by 0 days.

(21) Appl. No.: 14/258,291

(22) Filed: Apr. 22, 2014

(65) Prior Publication Data

US 2014/0229138 A1 Aug. 14, 2014

Related U.S. Application Data

(63) Continuation-in-part of application No. 13/744,384, filed on Jan. 17, 2013, which is a continuation-in-part of application No. 13/351,429, filed on Jan. 17, 2012.

(51) Int. Cl.
| | |
|---|---|
| *H04N 7/18* | (2006.01) |
| *G01P 15/00* | (2006.01) |
| *A63B 15/02* | (2006.01) |
| *G01P 15/02* | (2013.01) |
| *A63F 13/00* | (2014.01) |
| *G06Q 10/08* | (2012.01) |
| *H04M 1/725* | (2006.01) |

(52) U.S. Cl.
CPC ............. *G01P 15/02* (2013.01); *A63F 13/00* (2013.01); *G06Q 10/0833* (2013.01); *H04M 1/7253* (2013.01); *H04N 7/18* (2013.01); *H04M 2250/12* (2013.01)
USPC .............................. 348/157; 702/141; 482/1

(58) Field of Classification Search
None
See application file for complete search history.

(56) References Cited

U.S. PATENT DOCUMENTS

| 1,712,537 A | 5/1929 | White |
| 3,182,508 A | 5/1965 | Varju |

(Continued)

FOREIGN PATENT DOCUMENTS

| JP | 2004207985 | 7/2004 |
| JP | 2011-000367 | 6/2011 |

(Continued)

OTHER PUBLICATIONS

International Search Report received for PCT Application No. PCT/US2012/065716, dated Jan. 3, 2013, 10 pages.

(Continued)

*Primary Examiner* — Frederick Bailey
(74) *Attorney, Agent, or Firm* — ARC IP Law, PC; Joseph J. Mayo (57) ABSTRACT

An initialization method for an inertial sensor that estimates starting orientation and velocity without requiring the sensor to start at rest or in a well-known location or orientation. Initialization uses patterns of motion encoded as a set of soft constraints that are expected to hold approximately during an initialization period. Penalty metrics are defined to measure the deviation of calculated motion trajectories from the soft constraints. Differential equations of motion for an inertial sensor are solved with the initial conditions as variables; the initial conditions that minimize the penalty metrics are used as estimates for the actual initial conditions of the sensor. Soft constraints and penalty metrics for a specific application are chosen based on the types of motion patterns expected for this application. Illustrative cases include applications with relatively little movement during initialization, and applications with approximately periodic motion during initialization.

3 Claims, 11 Drawing Sheets

(56) References Cited

U.S. PATENT DOCUMENTS

| | | |
|---|---|---|
| 3,226,704 A | 12/1965 | Petrash |
| 3,270,564 A | 9/1966 | Evans |
| 3,788,647 A | 1/1974 | Evans |
| 3,792,863 A | 2/1974 | Evans |
| 3,806,131 A | 4/1974 | Evans |
| 3,945,646 A | 3/1976 | Hammond |
| 4,759,219 A | 7/1988 | Cobb et al. |
| 4,898,389 A | 2/1990 | Plutt |
| 4,910,677 A | 3/1990 | Remedio et al. |
| 4,940,236 A | 7/1990 | Allen |
| 4,991,850 A | 2/1991 | Wilhlem |
| 5,056,783 A | 10/1991 | Matcovich et al. |
| 5,086,390 A | 2/1992 | Matthews |
| 5,111,410 A | 5/1992 | Nakayama et al. |
| 5,127,044 A | 6/1992 | Bonito et al. |
| 5,184,295 A | 2/1993 | Mann |
| 5,230,512 A | 7/1993 | Tattershall |
| 5,233,544 A | 8/1993 | Kobayashi |
| 5,249,967 A | 10/1993 | O'Leary et al. |
| 5,259,620 A | 11/1993 | Marocco |
| 5,283,733 A | 2/1994 | Colley |
| 5,298,904 A | 3/1994 | Olich |
| 5,332,225 A | 7/1994 | Ura |
| 5,333,061 A | 7/1994 | Nakashima et al. |
| 5,364,093 A | 11/1994 | Huston et al. |
| 5,372,365 A | 12/1994 | McTeigue et al. |
| 5,441,256 A | 8/1995 | Hackman |
| 5,441,269 A | 8/1995 | Henwood |
| 5,486,001 A | 1/1996 | Baker |
| 5,524,081 A | 6/1996 | Paul |
| 5,542,676 A | 8/1996 | Howe et al. |
| 5,592,401 A | 1/1997 | Kramer |
| 5,638,300 A | 6/1997 | Johnson |
| 5,665,006 A | 9/1997 | Pellegrini |
| 5,688,183 A | 11/1997 | Sabatino et al. |
| 5,694,340 A | 12/1997 | Kim |
| 5,772,522 A | 6/1998 | Nesbit |
| 5,779,555 A | 7/1998 | Nomura et al. |
| 5,792,001 A | 8/1998 | Henwood |
| 5,819,206 A | 10/1998 | Horton |
| 5,826,578 A | 10/1998 | Curchod |
| 5,868,578 A | 2/1999 | Baum |
| 5,904,484 A | 5/1999 | Burns |
| 5,941,779 A | 8/1999 | Zeiner-Gundersen |
| 5,973,596 A | 10/1999 | French et al. |
| 6,030,109 A | 2/2000 | Lobsenz |
| 6,044,704 A | 4/2000 | Sacher |
| 6,073,086 A | 6/2000 | Marinelli |
| 6,224,493 B1 | 5/2001 | Lee et al. |
| 6,248,021 B1 | 6/2001 | Ognjanovic |
| 6,293,802 B1 | 9/2001 | Ahlgren |
| 6,366,205 B1 | 4/2002 | Sutphen |
| 6,441,745 B1 | 8/2002 | Gates |
| 6,456,938 B1 | 9/2002 | Barnard |
| 6,567,536 B2 | 5/2003 | McNitt |
| 6,582,328 B2 | 6/2003 | Kuta et al. |
| 6,697,820 B1 | 2/2004 | Tarlie |
| 6,705,942 B1 | 3/2004 | Crook et al. |
| 6,746,336 B1 | 6/2004 | Brant et al. |
| 6,757,572 B1 | 6/2004 | Forest |
| 6,774,932 B1 | 8/2004 | Ewing et al. |
| 6,802,772 B1 | 10/2004 | Kunzle et al. |
| 6,900,759 B1 | 5/2005 | Katayama |
| 6,908,404 B1 | 6/2005 | Gard |
| 6,923,729 B2 | 8/2005 | McGinty et al. |
| 7,004,848 B2 | 2/2006 | Konow |
| 7,021,140 B2 | 4/2006 | Perkins |
| 7,037,198 B2 | 5/2006 | Hameen-Anttila |
| 7,092,846 B2 | 8/2006 | Vock et al. |
| 7,118,498 B2 | 10/2006 | Meadows et al. |
| 7,121,962 B2 | 10/2006 | Reeves |
| 7,143,639 B2 | 12/2006 | Gobush |
| 7,160,200 B2 | 1/2007 | Grober |
| 7,175,177 B2 | 2/2007 | Meifu et al. |
| 7,205,894 B1 | 4/2007 | Savage |
| 7,219,033 B2 | 5/2007 | Kolen |
| 7,234,351 B2 | 6/2007 | Perkins |
| 7,264,554 B2 | 9/2007 | Bentley |
| 7,421,369 B2 | 9/2008 | Clarkson |
| 7,433,805 B2 | 10/2008 | Vock et al. |
| 7,457,439 B1 | 11/2008 | Madsen |
| 7,457,724 B2 | 11/2008 | Vock et al. |
| 7,492,367 B2 | 2/2009 | Mahajan et al. |
| 7,494,236 B2 | 2/2009 | Lim |
| 7,561,989 B2 | 7/2009 | Banks |
| 7,623,987 B2 | 11/2009 | Vock et al. |
| 7,689,378 B2 | 3/2010 | Kolen |
| 7,713,148 B2 | 5/2010 | Sweeney |
| 7,736,242 B2 | 6/2010 | Stites et al. |
| 7,771,263 B2 | 8/2010 | Telford |
| 7,780,450 B2 | 8/2010 | Tarry |
| 7,800,480 B1 | 9/2010 | Joseph et al. |
| 7,813,887 B2 | 10/2010 | Vock et al. |
| 7,831,212 B1 | 11/2010 | Balardeta et al. |
| 7,871,333 B1 | 1/2011 | Davenport |
| 7,966,154 B2 | 6/2011 | Vock et al. |
| 7,983,876 B2 | 7/2011 | Vock et al. |
| 8,036,826 B2 | 10/2011 | MacIntosh et al. |
| 8,117,888 B2 | 2/2012 | Chan et al. |
| 8,172,722 B2 | 5/2012 | Molyneux et al. |
| 8,231,506 B2 | 7/2012 | Molyneux et al. |
| 8,249,831 B2 | 8/2012 | Vock et al. |
| 8,257,191 B2 | 9/2012 | Stites et al. |
| 8,314,840 B1 * | 11/2012 | Funk ............................. 348/157 |
| 8,400,548 B2 | 3/2013 | Bilbrey et al. |
| 8,425,292 B2 | 4/2013 | Lui et al. |
| 2001/0029207 A1 | 10/2001 | Cameron et al. |
| 2001/0035880 A1 | 11/2001 | Musatov et al. |
| 2001/0045904 A1 | 11/2001 | Silzer, Jr. |
| 2001/0049636 A1 | 12/2001 | Hudda et al. |
| 2002/0004723 A1 | 1/2002 | Meifu et al. |
| 2002/0019677 A1 | 2/2002 | Lee |
| 2002/0049507 A1 | 4/2002 | Hameen-Anttila |
| 2002/0052750 A1 | 5/2002 | Hirooka |
| 2002/0064764 A1 | 5/2002 | Fishman |
| 2002/0072815 A1 | 6/2002 | McDonough et al. |
| 2002/0077189 A1 | 6/2002 | Tuer et al. |
| 2002/0082775 A1 | 6/2002 | Meadows et al. |
| 2002/0126157 A1 | 9/2002 | Farago et al. |
| 2002/0151994 A1 | 10/2002 | Sisco |
| 2002/0173364 A1 | 11/2002 | Boscha |
| 2002/0177490 A1 | 11/2002 | Yong et al. |
| 2002/0188359 A1 | 12/2002 | Morse |
| 2003/0008722 A1 | 1/2003 | Konow |
| 2003/0109322 A1 | 6/2003 | Funk et al. |
| 2003/0191547 A1 | 10/2003 | Morse |
| 2004/0147329 A1 | 7/2004 | Meadows et al. |
| 2004/0227676 A1 | 11/2004 | Kim et al. |
| 2005/0021292 A1 | 1/2005 | Vock et al. |
| 2005/0032582 A1 | 2/2005 | Mahajan et al. |
| 2005/0054457 A1 | 3/2005 | Eyestone et al. |
| 2005/0213076 A1 | 9/2005 | Saegusa |
| 2005/0215340 A1 | 9/2005 | Stites et al. |
| 2005/0227775 A1 | 10/2005 | Cassady et al. |
| 2005/0261073 A1 | 11/2005 | Farrington, Jr. et al. |
| 2005/0268704 A1 | 12/2005 | Bissonnette et al. |
| 2005/0272516 A1 | 12/2005 | Gobush |
| 2005/0282650 A1 | 12/2005 | Miettinen et al. |
| 2005/0288119 A1 | 12/2005 | Wang et al. |
| 2006/0025229 A1 | 2/2006 | Mahajan et al. |
| 2006/0038657 A1 | 2/2006 | Denison et al. |
| 2006/0063600 A1 | 3/2006 | Grober |
| 2006/0084516 A1 | 4/2006 | Eyestone et al. |
| 2006/0109116 A1 | 5/2006 | Keays |
| 2006/0122002 A1 | 6/2006 | Konow |
| 2006/0189389 A1 | 8/2006 | Hunter et al. |
| 2006/0199659 A1 | 9/2006 | Caldwell |
| 2006/0250745 A1 | 11/2006 | Butler et al. |
| 2006/0270450 A1 | 11/2006 | Garratt et al. |
| 2006/0276256 A1 | 12/2006 | Storek |
| 2007/0052807 A1 | 3/2007 | Zhou et al. |
| 2007/0062284 A1 | 3/2007 | Machida |
| 2007/0087866 A1 | 4/2007 | Meadows et al. |
| 2007/0099715 A1 | 5/2007 | Jones et al. |

(56) References Cited

U.S. PATENT DOCUMENTS

| | | |
|---|---|---|
| 2007/0111811 A1 | 5/2007 | Grober |
| 2007/0129178 A1 | 6/2007 | Reeves |
| 2007/0135225 A1 | 6/2007 | Nieminen |
| 2007/0135237 A1 | 6/2007 | Reeves |
| 2007/0219744 A1 | 9/2007 | Kolen |
| 2007/0270214 A1 | 11/2007 | Bentley |
| 2007/0298896 A1 | 12/2007 | Nusbaum |
| 2008/0108456 A1 | 5/2008 | Bonito |
| 2008/0280642 A1 | 11/2008 | Coxhill et al. |
| 2008/0285805 A1 | 11/2008 | Luinge et al. |
| 2009/0017944 A1 | 1/2009 | Savarese et al. |
| 2009/0029754 A1 | 1/2009 | Slocum et al. |
| 2009/0033741 A1 | 2/2009 | Oh et al. |
| 2009/0036237 A1 | 2/2009 | Nipper et al. |
| 2009/0088276 A1 | 4/2009 | Solheim et al. |
| 2009/0111602 A1 | 4/2009 | Savarese et al. |
| 2009/0131190 A1 | 5/2009 | Kimber |
| 2009/0137333 A1 | 5/2009 | Lin et al. |
| 2009/0174676 A1 | 7/2009 | Westerman |
| 2009/0177097 A1 | 7/2009 | Ma et al. |
| 2009/0209358 A1 | 8/2009 | Niegowski |
| 2009/0213134 A1 | 8/2009 | Stephanick et al. |
| 2009/0233735 A1 | 9/2009 | Savarese et al. |
| 2009/0299232 A1 | 12/2009 | Lanfermann et al. |
| 2010/0049468 A1 | 2/2010 | Papadourakis |
| 2010/0062869 A1 | 3/2010 | Chung et al. |
| 2010/0063778 A1 | 3/2010 | Schrock et al. |
| 2010/0063779 A1 | 3/2010 | Schrock et al. |
| 2010/0091112 A1 | 4/2010 | Veeser et al. |
| 2010/0093458 A1 | 4/2010 | Davenport et al. |
| 2010/0099509 A1 | 4/2010 | Ahem et al. |
| 2010/0113174 A1 | 5/2010 | Ahern |
| 2010/0121228 A1 | 5/2010 | Stirling et al. |
| 2010/0130298 A1 | 5/2010 | Dugan et al. |
| 2010/0144414 A1 | 6/2010 | Edis et al. |
| 2010/0144456 A1 | 6/2010 | Ahern |
| 2010/0216564 A1 | 8/2010 | Stites et al. |
| 2010/0222152 A1 | 9/2010 | Jaekel et al. |
| 2010/0308105 A1 | 12/2010 | Savarese et al. |
| 2011/0037778 A1 | 2/2011 | Deng et al. |
| 2011/0050864 A1 | 3/2011 | Bond |
| 2011/0052005 A1 | 3/2011 | Selner |
| 2011/0053688 A1 | 3/2011 | Crawford |
| 2011/0075341 A1 | 3/2011 | Lau et al. |
| 2011/0165998 A1 | 7/2011 | Lau et al. |
| 2011/0230273 A1 | 9/2011 | Niegowski et al. |
| 2011/0230274 A1 | 9/2011 | Lafortune et al. |
| 2011/0230985 A1 | 9/2011 | Niegowski et al. |
| 2011/0230986 A1 | 9/2011 | Lafortune |
| 2011/0305369 A1 | 12/2011 | Bentley |
| 2012/0115682 A1 | 5/2012 | Homsi |
| 2012/0191405 A1* | 7/2012 | Molyneux et al. ............ 702/141 |
| 2013/0110415 A1 | 5/2013 | Davis et al. |

FOREIGN PATENT DOCUMENTS

| | | |
|---|---|---|
| KR | 10-2003-0085275 | 5/2003 |
| KR | 10-2006-0041060 | 5/2006 |
| KR | 10-2007-0119018 | 12/2007 |
| KR | 10-2010-0074068 | 1/2010 |
| KR | 10-2010-0020131 | 2/2010 |
| KR | 10-1079319 | 4/2011 |
| WO | 94/27683 | 8/1994 |
| WO | 2011057194 | 5/2011 |

OTHER PUBLICATIONS

MyCaddie, 2009, retrieved on Sep. 26, 2012 from http://www.iMakePars.com, 4 pages.

Swing it See it Fix it, Improve Gold Swing, SwingSmart Golf Analyzer, retrieved on Sep. 26, 2012 from http://www.SwingSmart.com, 2 pages.

Learn how Swingbyte can improve your game, retrieved on Sep. 26, 2012 from http://www.swingbyte.com, 2 pages.

IPER, PCT/US2011/049461, dated May 10, 2013, 5 pages.

IPER, PCT/US2011/055173, dated Apr. 25, 2013, 5 pages.

TRACE—The Most Advanced Activity Monitor for Action Sports, webpage, retrieved on Aug. 6, 2013, 22 pages.

miCoach SPEED_CELL TM, User Manual, 23 pages.

Nike+iPod, User Guide, 32 pages.

ActiveReply, "TRACE—The Most Advanced Activity Monitor for Action Sports",http://www.kickstarter.com/projects/activereplay/trace-the-most-advanced-activity-monitor-for-actio, 13 pages, Jul. 31, 2013.

International Preliminary Report on Patentability, received for PCT Appl. No. PCT/US2012/065716, dated May 30, 2014, 6 pages.

King, The Design and Application of Wireless Mems Inertial Measurement Units for the Measurement and Analysis of Golf Swings, 2008.

Grober, an Accelerometer Based Instrumentation of the Golf Club: Comparative Analysis of Golf Swings, 2009.

Gehrig et al, Visual Golf Club Tracking for Enhanced Swing Analysis, Computer Vision Lab, Lausanne, Switzerland, undated.

Clemson University, Golf Shot Tutorial, http://www.webnucleo.org/home/online_tools/newton/0.4/html/about_this_tool/tutorials/golf 1.shp.cgi, retrieved on Aug. 11, 2013.

* cited by examiner

INITIALIZING AN INERTIAL SENSOR USING SOFT CONSTRAINTS AND PENALTY FUNCTIONS

This application is a continuation-in-part of U.S. Utility patent application Ser. No. 13/744,384 filed 17 Jan. 2013, which is a continuation-in-part of U.S. Utility patent application Ser. No. 13/351,429 filed 17 Jan. 2012, the specifications of which are hereby incorporated herein by reference.

BACKGROUND OF THE INVENTION

1. Field of the Invention

One or more embodiments pertain to the field of motion capture and initialization of sensors associated therewith that may be coupled with a user or piece of equipment. More particularly, but not by way of limitation, one or more embodiments enable initializing an inertial sensor using soft constraints and penalty functions to estimate the initial conditions of an inertial sensor device. The initialization generally occurs at a point in time based on data captured from this device during an initialization time interval, and on a set of soft constraints on the motion of this device during this interval.

2. Description of the Related Art

Inertial sensors are commonly used for motion tracking and navigation. They offer the advantage that they can be used to estimate the motion of an object without the need for external inputs or references. These systems typically include accelerometers to measure linear forces, and gyroscopes to measure rotational motion.

Such systems have been used for many years as navigation aids for ships and airplanes. More recently as inexpensive MEMS sensors have become widely available, inertial sensors are increasingly embedded into consumer products such as smartphones.

Pure inertial sensors are unable to detect uniform linear motion; this is essentially a consequence of the principle of relativity. They are also unable to determine absolute position or orientation. Effectively inertial sensors can be used for tracking changes in position and orientation. As motion tracking or navigation devices, they rely on dead-reckoning techniques to estimate new positions and orientations from known starting conditions and from the changes detected by the inertial sensor.

Applications using inertial sensors must therefore use some method to determine the initial conditions of the sensor prior to measuring the changes in position and orientation via the inertial data. Existing systems generally use one or both of two approaches for this initialization.

One existing approach to inertial sensor initialization is to place the sensor in a known position and orientation, and to ensure that it is at rest (with no linear or rotational motion) for some period of time prior to beginning motion tracking. The initial position and orientation of the sensor can then be provided directly to the motion tracking algorithm, and the initial linear and angular velocity can be set to zero to reflect the at-rest initial state. This approach is extremely simple, but may not be applicable in some situations. Sometimes the initial position or initial orientation may not be known. In some applications it may not be feasible to require an at-rest period of time before beginning motion tracking.

Existing systems that require the sensor to be at rest prior to starting motion tracking can sometimes obtain an estimate of the initial tilt of the sensor relative to vertical, by using the accelerometer as a sensor of the gravity vector. This technique is only applicable when the sensor is at rest and when there is negligible vibration; otherwise the accelerometer data will reflect a combination of true acceleration and gravity.

A second existing approach to inertial sensor initialization is to supplement the inertial sensor data with other sensor data feeds. For example, a GPS system is often used in conjunction with an inertial sensor to provide a data feed with absolute position information. A magnet may be used in conjunction with an inertial sensor to provide a data feed with absolute orientation information. These types of hybrid systems combining inertial and non-inertial sensors are commonly used for navigation. For example, a GPS system may be used as a primary navigation tool, with an inertial sensor providing extrapolation between GPS updates and backup in case of temporary unavailability of a GPS signal.

The disadvantage of hybrid systems is the cost and complexity of the additional sensor hardware and software. In particular for GPS (or a similar location-finding system, such as one using cell phone signals), a GPS receiver must be integrated into the sensor hardware. This may be impractical, or it may not work at all in certain environments such as indoors.

In summary, known systems for initializing an inertial sensor generally rely on either placing the sensor at rest and in known conditions, or supplementing the inertial sensor with additional sensor feeds. Either approach has limitations and disadvantages for certain applications. There is therefore a need for an inertial sensor initialization method that can be used under more general conditions and without the need for additional sensor hardware.

BRIEF SUMMARY OF THE INVENTION

Embodiments of the invention relate to a method to estimate the initial conditions of an inertial sensor device at a point in time based on data captured from this device during an initialization time interval, and on a set of soft constraints on the motion of this device during this interval. These constraints may be called soft constraints because in some embodiments they are expected to hold only approximately for the motion of the device during the initialization time interval. Small deviations from these soft constraints may be expected, but large deviations may be expected to be unlikely. Different soft constraints may be used by different embodiments of the invention, potentially reflecting the typical patterns of motion expected in various applications that use these different embodiments.

One or more embodiments of the invention may not require that the inertial sensor be at rest or be in a particular orientation throughout an initialization time interval. Furthermore some embodiments may not require that the data captured from the inertial sensor be supplemented with other non-inertial data such as GPS readings. Embodiments of the invention therefore can be used to estimate initial conditions of an inertial sensor under a broad range of conditions, and without additional sensor hardware, by using expected patterns of motion during initialization as a set of soft constraints. For example, one or more embodiments of the invention may be used to estimate the initial orientation or initial velocity of an apparatus that is in continuous use, where it is impractical to require that the apparatus be kept at rest for a dedicated initialization procedure. Such a use case might apply for example to sports equipment with an integrated inertial sensor, where it is impractical to interrupt the user of the equipment during a game for initialization of the equipment's orientation or velocity.

Embodiments of the invention may use one or more penalty metrics to quantify the deviation of actual motion trajectories of an inertial sensor device from a set of soft constraints. As with the soft constraints themselves, the penalty metrics used by one or more embodiment of the invention may be chosen based on the expected patterns of motion in applications using such embodiments.

In one or more embodiments, estimates of initial conditions for the inertial sensor may be calculated by minimizing the penalty metrics. Effectively this procedure finds initial conditions that generate motion trajectories (which may include position and velocity trajectories) that are close to the soft constraints defined for such embodiments. For a typical inertial motion tracking application in the existing art, the inertial sensor's initial conditions are known, and the motion trajectory of the sensor is calculated by integrating (either analytically or numerically) the well-known differential equations of motion for an inertial sensor. The approach used in one or more embodiments of the invention is in a sense the inverse of the typical motion tracking approach: the initial conditions may be treated as variables to be found by minimizing the deviation of the motion trajectory from the soft constraints.

Determining the initial conditions that minimize the penalty metrics may be done by any of a set of known techniques for function minimization. They include direct analytic techniques (which can sometimes be used for simple functional forms) and various numerical methods for function optimization. Embodiments of the invention may also apply approximate minimization methods to obtain an inexact but useful estimate of initial conditions. Such approximate methods might be used for example if the initialization calculations are performed on embedded processors with relatively small computing capacity, or if obtaining an approximate estimate is very time-critical.

In one or more embodiments of the invention, the soft constraints on the motion of the inertial sensor may include a constraint that the position of the sensor change relatively little during the initialization period, and that the initial velocity of the sensor be relatively small. These embodiments may use a simple penalty metric consisting of the net change in position of the inertial sensor across the initialization period. This type of simple penalty metric might be used, for instance, in one or more embodiments for a golf swing analysis application where the player is moving his golf club (which contains an integrated or attached inertial sensor) during address, but the club head never moves very far from the ball during this address period, and it never moves very fast during address.

In one or more embodiments, the initial orientation of the sensor can be calculated directly using a technique of separating the differential equations of motion into the orientation equation, and the position and velocity equations. This separation of differential equations yields an expression for the net change in position (the penalty metric) that can be minimized analytically to give the initial orientation estimate. This analytic solution may offer benefits in applications that cannot afford the time or computational resources for an iterative numerical minimization approach.

In one or more embodiments of the invention, the soft constraints on the motion of the inertial sensor may include one or more constraints indicating that the motion be approximately periodic during the initialization interval. The penalty metrics in one or more embodiments may include the net change in position and the net change in velocity across a single selected period of motion. Such constraints and penalty metrics might be used, for instance, in one or more embodiments for a baseball swing analysis application where the batter is moving his bat in a quasi-periodic back and forth motion, or in a repetitive circular motion, while waiting for a pitch.

In one or more embodiments of the invention, an estimate for the period of motion may be calculated in a preliminary processing step prior to minimizing the penalty metrics. One or more embodiments may include a period estimation step that uses a discrete Fourier transform (DFT) on the inertial sensor data during initialization in order to identify a dominant frequency of motion (and hence a dominant period). Use of a preliminary period estimating step offers the benefit that the period can be calculated dynamically from the observed motion. It can therefore be an adaptive method used by one or more embodiments that adjusts the soft constraints (in particular, the period) to a particular motion pattern observed for a particular event.

In one or more embodiments that use penalty metrics comprising net position change or net velocity change across a period, separation of the differential equations may be applied to yield expressions for the net change in velocity and position during this initialization period. In one or more embodiments these expressions can be solved analytically in sequence: first the initial orientation can be calculated to minimize the net change in velocity, and then the initial velocity can be calculated to minimize the net change in position.

In one or more embodiments of the invention, a method may be utilized in determining an estimate of the initial orientation and initial velocity of an inertial sensor, which includes collecting sample data from the inertial sensor over a capture time interval that includes an activity of interest, wherein the sample data includes accelerometer data and rate gyro data. The accelerometer data and rate gyro data are each time series of three-dimensional vectors; in some embodiments the inertial sensor may provide data on fewer than three axes for the gyro or the accelerometer, but this data can always be embedded into three-dimensional vectors. The orientation of the inertial sensor at any point in time is an orthogonal transformation of three-dimensional space, which may be represented in various forms such as three-by-three matrix or a unit quaternion. The velocity and position of the inertial sensor at any point and time are each three-dimensional vectors. An initialization time interval is selected within the capture time interval. A set of soft constraints is defined on the position and velocity trajectories of the inertial sensor during the initialization interval. Each of the soft constraints defines a set of possible trajectories for the position vector and the velocity vector. In one or more embodiments of the invention, the soft constraints represent approximations of typical patterns of position and velocity trajectories for the activity of interest during the initialization interval. A set of penalty metrics is defined to quantify the deviation of calculated position and velocity trajectories of the inertial sensor from the soft constraints. Estimates of the initial orientation and the initial velocity of the inertial sensor at the start of the initialization interval are calculated to minimize the penalty metrics when the initial orientation and initial velocity estimates are used as initial conditions to integrate the sample gyro and accelerometer data into orientation, velocity, and position over the initialization interval. In one or more embodiments, the integration uses coupled differential equations of motion for an inertial sensor that relate time derivatives of orientation, velocity, and position to each other and to the measured accelerometer and gyro data. In one or more embodiments, a differential equation is used wherein the time derivative of orientation is equal to the orientation times the skew-symmetric matrix representing the cross-product with the gyro vector. A second differential equation is used wherein the time derivative of the velocity vector is equal to the orientation times the accelerometer vector, this quantity added to the gravity vector. The gravity vector term reflects the fact that the inertial sensor's accelerometer measures apparent motion relative to free-fall rather than true acceleration. A third differential equation is used wherein the time derivative of the position vector is equal to the velocity vector.

In one or more embodiments of the invention, the soft constraints include a requirement that the change in position between the start and end of the initialization interval be zero, reflecting that the inertial sensor is expected to remain effectively in the same place or in a limited region of space across the initialization interval. In one or more embodiments the penalty metrics include a metric that is defined the absolute value of the difference in position between the end of the initialization interval and the start of the initialization interval. This metric measures the deviation of the position trajectory from the soft constraint of zero net movement of the inertial sensor. In one or more embodiments, the estimate of the initial velocity of the inertial sensor is set to zero, and minimization of the penalty metrics is used to estimate the initial orientation of the sensor.

In one or more embodiments of the invention, the soft constraints include a requirement that the position and velocity of the inertial sensor be periodic during the initialization interval. In one or more embodiments, an estimate for the dominant period of motion during the initial interval is obtained by calculating frequency domain signals for each axis of the rate gyro using a discrete Fourier transform on the corresponding axis of the rate gyro data time series during the initialization interval. Peak magnitudes of the transformed frequency domain signals on each axis are calculated, and the maximum peak magnitude across all axes is obtained. The frequency at which this maximum peak magnitude occurs is used as the dominant frequency for the motion during the initialization interval. The dominant period of motion is calculated as the reciprocal of the dominant frequency. In one or more embodiments, the penalty metrics include a velocity penalty metric that is the absolute value of the change in velocity over one period of motion, and a position penalty metric that is the absolute value of the change in position over one period of motion. A designated period of time within the initialization interval is selected, with length equal to the dominant period of motion. In one or more embodiments, an estimate of the sensor's initial orientation is calculated first by minimizing the velocity penalty metric over the designated period, and then an estimate of the sensor's initial velocity is calculated by minimizing the position penalty metric over the designated period, using previously calculated estimate of initial orientation.

BRIEF DESCRIPTION OF THE DRAWINGS

The above and other aspects, features and advantages of the ideas conveyed through this disclosure will be more apparent from the following more particular description thereof, presented in conjunction with the following drawings wherein.

DETAILED DESCRIPTION OF THE INVENTION

A method for determining an estimate of the initial orientation and initial velocity of an inertial sensor will now be described. In the following exemplary description numerous specific details are set forth in order to provide a more thorough understanding of the ideas described throughout this specification. It will be apparent, however, to an artisan of ordinary skill that embodiments of ideas described herein may be practiced without incorporating all aspects of the specific details described herein. In other instances, specific aspects well known to those of ordinary skill in the art have not been described in detail so as not to obscure the disclosure. Readers should note that although examples of the innovative concepts are set forth throughout this disclosure, the claims, and the full scope of any equivalents, are what define the invention.

Figure 1:
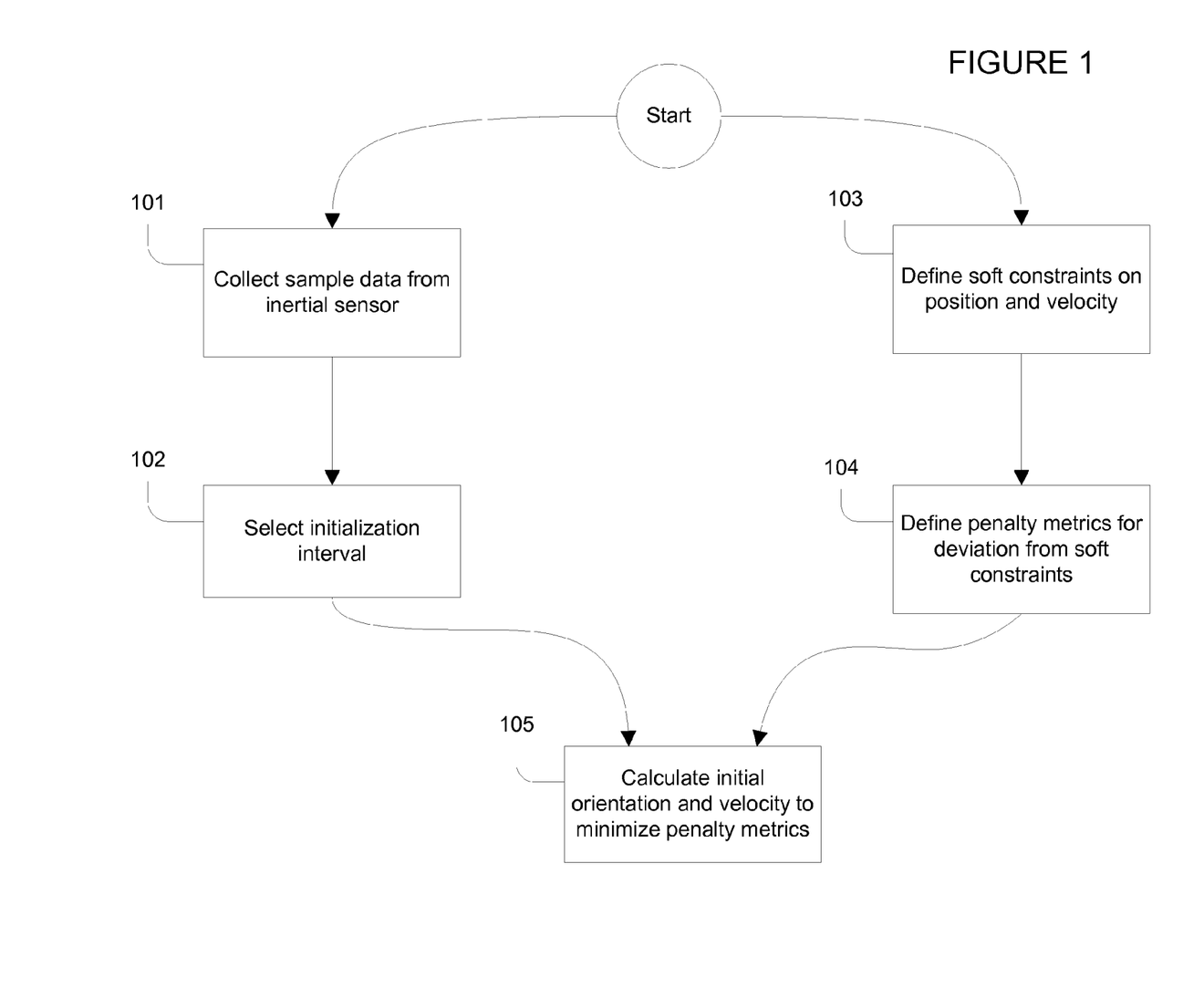
FIG. 1 shows a flowchart of an embodiment of the invention, which illustrates the major steps in the method to generate an estimate of the initial orientation of an inertial sensor device.

FIG. 1 illustrates a flow chart for an embodiment of a method to determine the initial orientation and initial velocity of an inertial sensor. Sample data is captured from the inertial sensor at 101. This sample data consists of one or more time series of measurements across a capture time interval, wherein this capture time interval includes an activity of interest. Within this capture time interval an initialization interval is selected at 102. This initialization interval will be used for the estimation calculations for the initial orientation and the initial velocity. Separately a set of soft constraints on the position and velocity of the inertial sensor are defined at 103. Penalty metrics that measure the deviation of calculated position and velocity from the soft constraints are defined at 104. The sample data from the initialization interval and the penalty metrics are used at 105 to calculate estimates of the initial orientation and initial velocity by minimizing the penalty metrics across the initialization interval.

Figure 2:
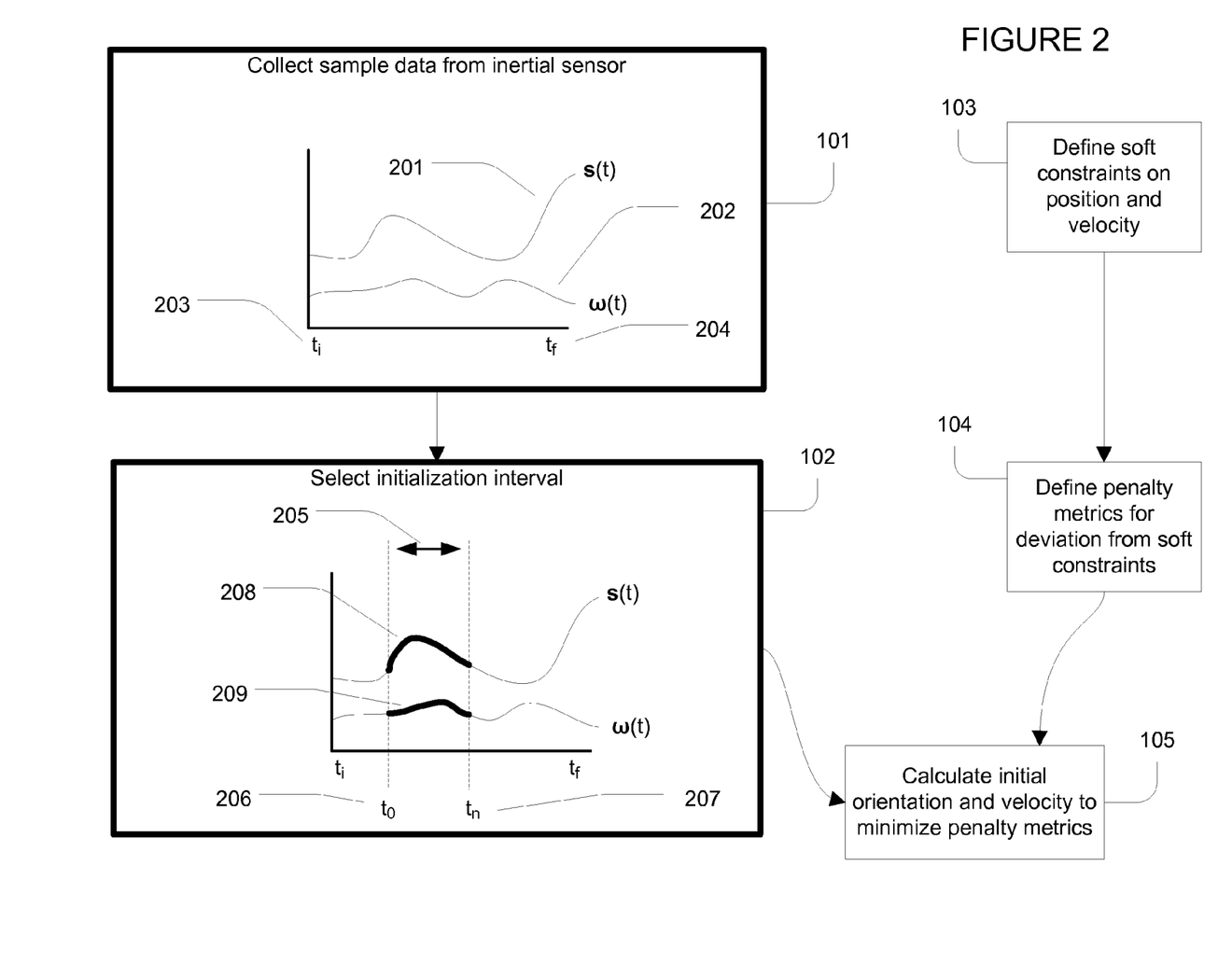
FIG. 2 shows a detailed view of two of the steps of FIG. 1, illustrating the data captured from the inertial sensor and the selection of an initialization interval.

FIG. 2 illustrates a detailed view of collecting sample data at 101 and selecting initialization interval at 102. In collection of sample data at 101, inertial sensor data is collected across a capture time interval $[t_i, t_f]$ with starting time 203 ($t_i$) and ending time 204 ($t_f$). In one embodiment, the inertial sensor contains a 3-axis accelerometer and a 3-axis rate gyro. In other embodiments, different data may be available including for example data from a magnetometer or location data from a GPS receiver. In an embodiment with a 3-axis accelerometer and a 3-axis rate gyro, sample data captured from the sensor includes a time series of accelerometer data 201, denoted s(t), and a time series of rate gyro data 202, denoted w(t). The boldface notion for s(t) and w(t) indicate that these are vector quantities (typically in 3-dimensional space); however for illustration these values are shown as 1-dimensional in curves 201 and 202. The notation s(t) for accelerometer data reflects the fact that a typical accelerometer measures specific force rather than true acceleration. The notation w(t) for rate gyro data indicates that a typical rate gyro measures angular velocity.

In FIG. 2, an initialization interval 205 is selected within the capture interval $[t_i, t_f]$. The initialization interval $[t_0, t_n] \subset [t_i, t_f]$ has starting point 206 ($t_0$) and ending point 207 ($t_n$). The initialization interval may be selected within the capture interval based on various criteria depending on the nature of the event of interest. For example, in one or more embodiments the initialization interval may consist of a fixed number of seconds at the beginning of the capture interval. In other embodiments the initialization interval may be determined dynamically by searching the capture interval for signatures indicating relatively low motion or activity. Once the initialization interval 205 is selected, the accelerometer data 208 and gyro data 209 over the initialization interval are used for the estimation of initial orientation and initial velocity, described below.

Figure 3:
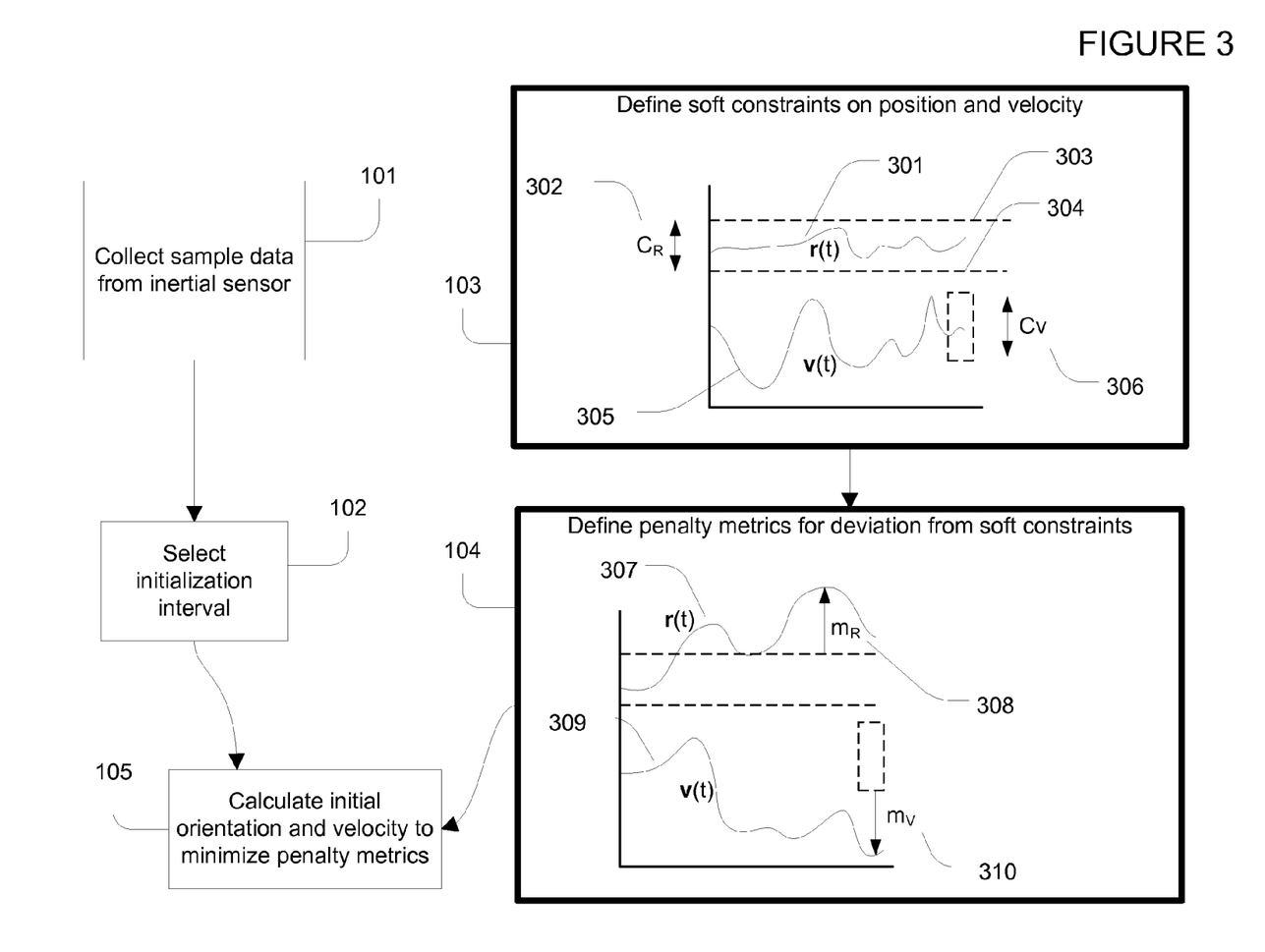
FIG. 3 shows a detailed view of two more of the steps of FIG. 1, illustrating the definition of soft constraints on position and velocity, and the definition of penalty metrics for deviations from these soft constraints.

FIG. 3 illustrates a detailed view of defining soft constraints 103 and defining penalty metrics 104. The position trajectory 301 of the inertial sensor, denoted r(t) and the velocity trajectory 305 of the inertial sensor, denoted v(t), are expected to approximately conform to certain patterns that are typical for the activity of interest. In general the position and velocity of the inertial sensor are vector quantities in 3-dimensional space; however for illustration these are shown in FIG. 3 as 1-dimensional values. The specific patterns expected for position and velocity will depend on the particular activity or activities of interest. In general, a soft constraint $C_i$ on position and velocity can be represented as a subset of the possible trajectories of position and velocity over the initialization interval: $C_i \subset \{r:[t_0, t_n] \to \mathbb{R}^3\} \times \{v:[t_0, t_n] \to \mathbb{R}^3\}$. An embodiment of the invention may include a set of these soft constraints, $\{C_i\}$. FIG. 3 shows illustrative constraints 302 and 306. These are examples for illustration only; other embodiments will include other types and numbers of soft constraints. Soft constraint 302, denoted $C_R$, is a constraint on the position trajectory 301. This constraint requires that the position r(t) remain within upper limit 303 and lower limit 304 through the entire time interval of interest. Soft constraint 306, denoted $C_V$, is a constraint on the velocity trajectory 305. Constraint 306 applies only at the endpoint of the trajectory; it requires that at this endpoint the velocity be within the limits defined by $C_V$. These illustrative soft constraints 302 and 306 show simple examples of the types of soft constraints that are possible; other embodiments may include more complex constraints on position, velocity, or both.

In FIG. 3 at 104, penalty metrics are defined to quantify the deviation of the position and velocity trajectories from the soft constraints defined at 103. Measured or calculated position 307, denoted r(t), does not satisfy soft constraint 302. Penalty metric 308, denoted $m_R$, measures the deviation of r(t) from the soft constraint. For illustration, the penalty metric $m_R$ is defined as the maximum absolute deviation of the position from the limits imposed by the soft constraint. Other embodiments might define different penalty metrics; for example one embodiment might use the average absolute deviation of position from the limits of the soft constraint, rather than the maximum deviation as shown in FIG. 3. The illustration of a velocity penalty metric is analogous to the illustration of a position penalty metric. Measured or calculated velocity 309, denoted v(t), does not satisfy soft constraint 306. Penalty metric 310, denoted $m_V$, measures the deviation of v(t) from the soft constraint. For illustration, the penalty metric $m_V$ is defined as the absolute deviation of the velocity from the limits imposed by the soft constraint. Since illustrative velocity soft constraint 306 applies only at the endpoint of the time interval, the velocity penalty metric 310 measures the deviation from the constraint only at this endpoint as well. As with the position penalty metric, this velocity penalty metric is only one example. Other embodiments might define different penalty metrics; for example one embodiment might use the square of the absolute deviation of velocity from the limits of the soft constraint, rather than the absolute value of the deviation as shown in FIG. 3.

Figure 4:
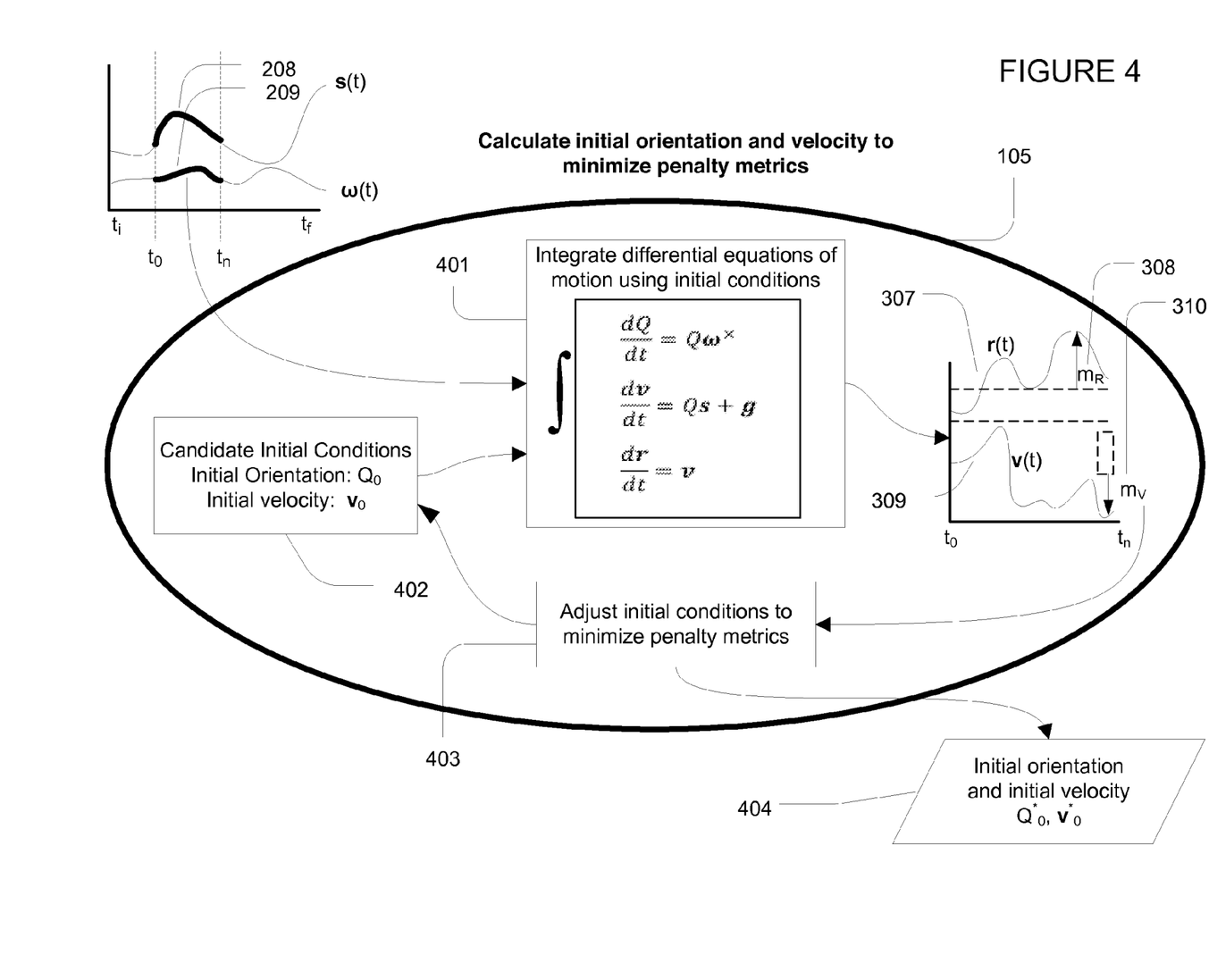
FIG. 4 shows a detailed view of an embodiment of the final step in the flowchart of FIG. 1, which calculates the initial conditions by integrating differential equations of motion and applying penalty metrics to the resulting position and velocity.

FIG. 4 illustrates a detailed view of calculating initial orientation and initial velocity to minimize penalty metrics, at 105. Accelerometer data 208, denoted s(t), and rate gyro data 209, denoted w(t) are inputs to the calculation procedure. These trajectories are available over initialization interval $[t_0, t_n]$. Given these inputs, and given initial conditions 402 on the sensor's orientation ($Q_0$) and velocity ($v_0$), the differential equations 401 can be solved to yield position trajectory 307 (r(t)) and velocity trajectory 309 (v(t)). Differential equations 401 are a set of simultaneous equations that relate the time derivatives of orientation Q(t), velocity v(t), and position r(t) to the observed measurements s(t) and w(t). These differential equations are well-known to one skilled in the art; they are a form of the equations for inertial navigation using a strap-down inertial sensor. The notation $w^\times$ in 401 indicates the linear operator S defined by $Sx=w \times x$, where $\times$ is the vector cross-product.

In the calculations of 105, the initial conditions 402 are treated as unknown quantities to be estimated. Each estimate of these initial conditions yields a particular pair of trajectories 307 and 309 for position and velocity. The penalty metrics 308 and 310 are then applied to these calculated trajectories. These penalty metrics generate an aggregate measure of the deviation of the calculated trajectories from the soft constraints. Different embodiments of the invention may employ various techniques to combine a set of penalty metrics into an aggregate measure of deviation of the soft constraints, such as summing the penalty metrics or minimizing one metric first and then minimizing other metrics in sequence. At 403, the initial conditions are adjusted to minimize the observed penalty metrics 308 and 310. This adjustment process may be iterative, as illustrated in FIG. 4, to seek initial conditions that minimize the penalty metrics. Any known technique for minimization of objective functions can be used to find the initial conditions that minimize the penalty metrics. Such techniques are well-known to one skilled in the art. After applying a selected minimization technique, the calculations at 105 yield the estimates of initial conditions

404, denoted $Q_0^*$ for the initial orientation estimate and $v_0^*$ for the initial velocity estimate.

Figure 5:
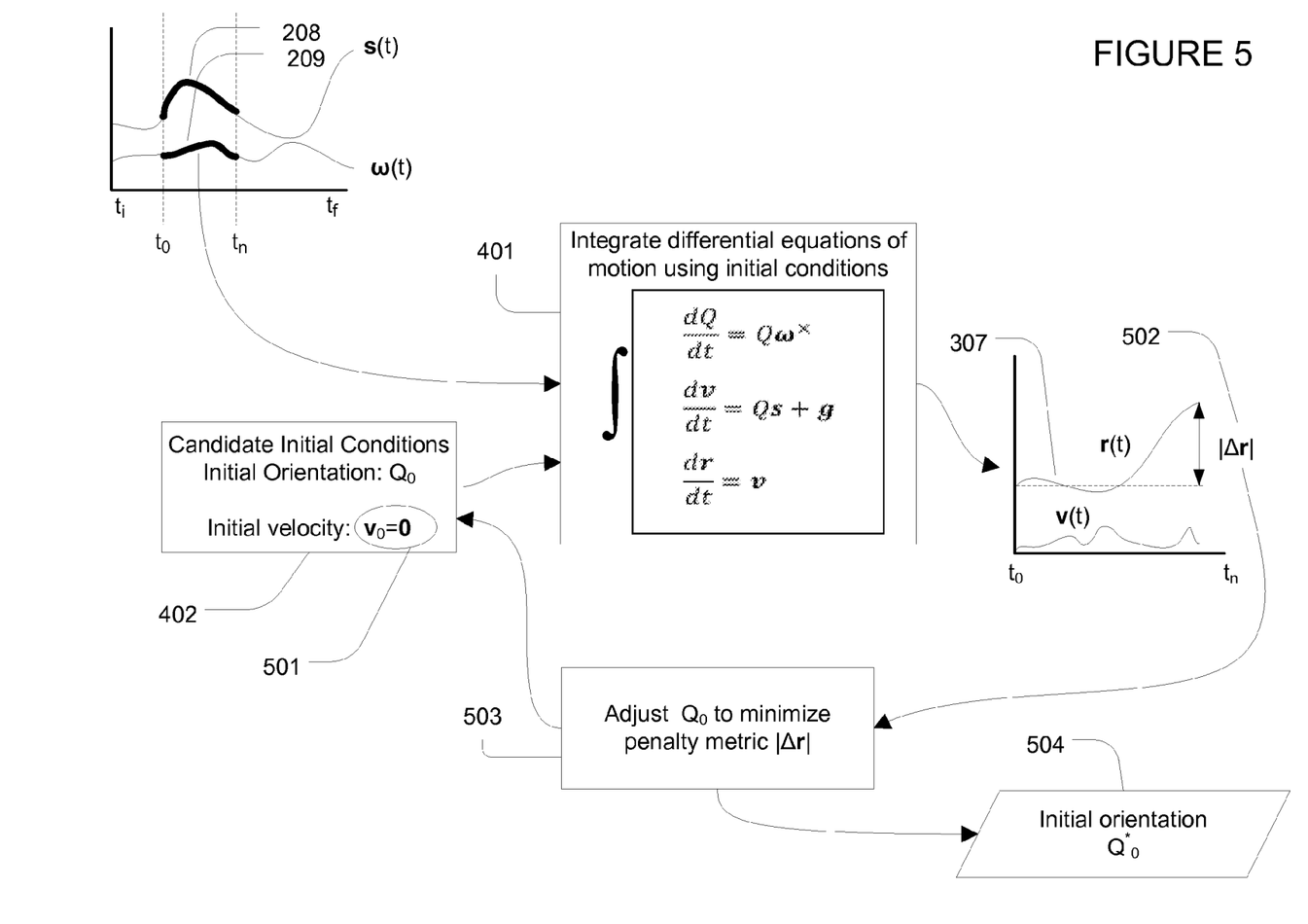
FIG. 5 illustrates an embodiment of the method where the penalty metric consists of the change in position over the initialization interval, and the initial velocity estimate is set to zero.

FIG. 5 illustrates an embodiment of the invention with a particular soft constraint for the position trajectory that reflects an expectation of minimal movement of the inertial sensor during the initialization interval. This type of soft constraint might apply, for example, to an activity where a person or a piece of equipment is relatively stationary before beginning the activity. FIG. 5 illustrates how the procedures in FIG. 4 are modified and specialized to this type of embodiment. As in FIG. 4, accelerometer data 208 and gyro data 209 are inputs into integration of differential equations 401, along with initial conditions 402, yielding position trajectory 307. In the embodiment illustrated in FIG. 5, the position penalty metric 502 is defined as the magnitude of the net change in position across the initialization interval: $|\Delta r|=|r(t_n)-r(t_0)|$. This penalty metric measures how closely the position trajectory conforms to the soft constraint of zero net movement of the sensor during the initialization interval. Other embodiments might use different penalty metrics to measure this deviation, such as the maximum change in position over the initialization interval from the starting position. In the embodiment illustrated in FIG. 5, a further simplification 501 is applied to the initial conditions by setting the initial velocity estimate to $v_0=0$. This simplification again reflects an expectation of relatively little motion during the initialization interval. Other embodiments might employ different assumptions about initial velocity. The minimization step 503 therefore adjusts only the initial orientation $Q_0$ to minimize the position penalty metric 502 ($|\Delta r|$), yielding the estimate 504 of initial orientation, denoted $Q_0^*$.

Figure 6:
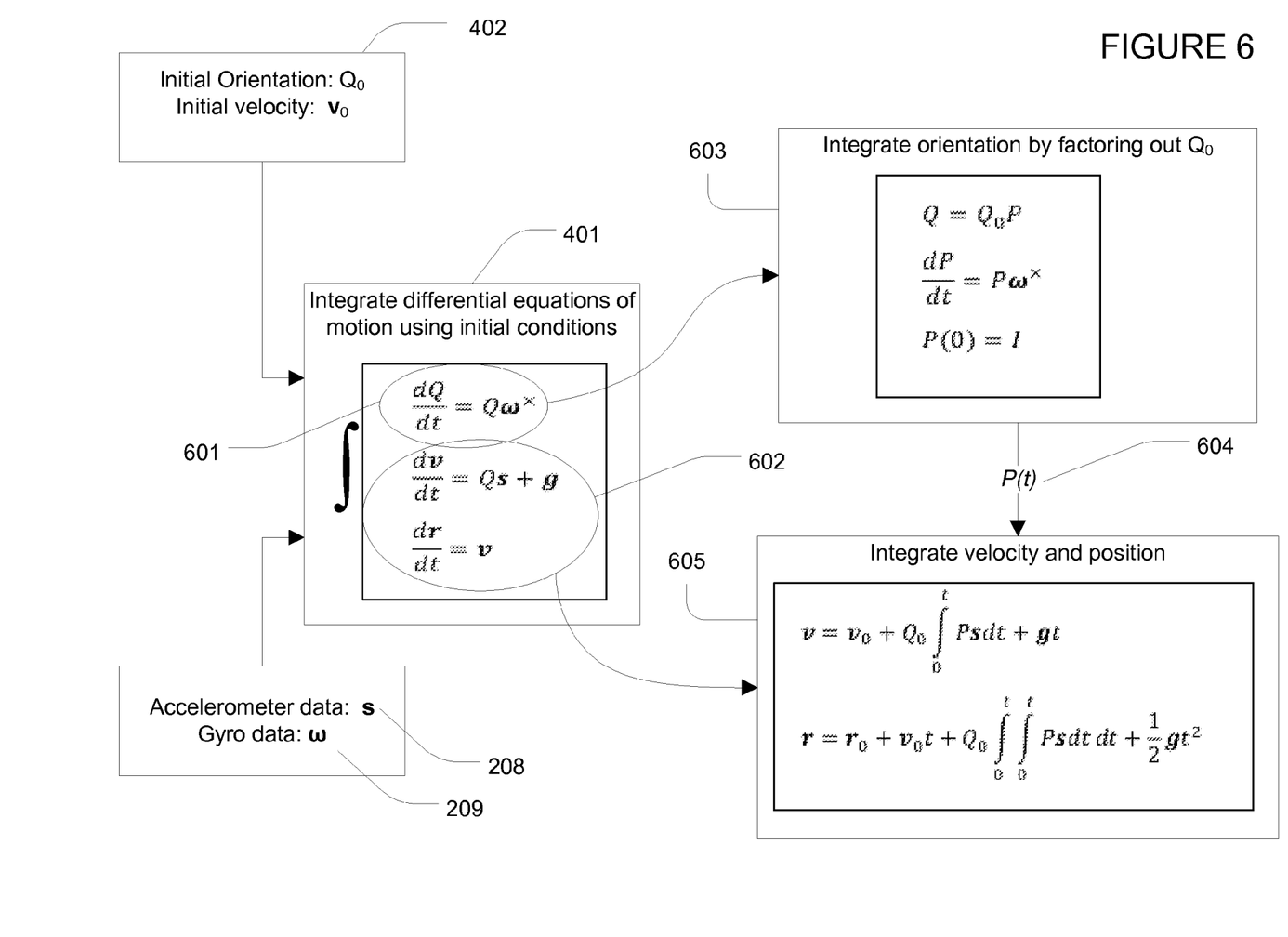
FIG. 6 illustrates an embodiment of the method that uses a specific technique to calculate the optimal initial orientation by factoring out the initial orientation from the equations of motion.

FIG. 6 illustrates a technique that may be applied in one or more embodiments of the invention to integrate the differential equations 401, using inputs 402 of initial orientation and initial velocity, and sensor data 208 and 209. In this technique the differential equation 601 is first solved separately. This equation, $$\frac{dQ}{dt} = Q\omega^x,$$

is solved at 603 by defining an auxiliary variable P where $Q=Q_0P$. This substitution yields equation $$\frac{dP}{dt} = P\omega^x$$

with initial condition $P(0)=I$ (where I is the identity matrix). This equation can be solved directly for P(t) with no dependence on the initial orientation $Q_0$. (In most cases P(t) will be calculated by numerical integration, since a closed-form solution will likely not exist.) Secondly, the remaining differential equations 602 can be solved using as input 604, the value of P(t) calculated in 603. These two equations are integrated in 605, yielding expressions for position and velocity: $v=v_0+Q_0\int_0^t Psdt+gt$, and $$r = r_0 + v_0 t + Q_0 \int_0^t \int_0^t Psdtdt + \frac{1}{2}gt^2.$$

In one or more embodiments these expressions are used to calculate initial conditions 402 that minimize the penalty metrics.

Figure 7:
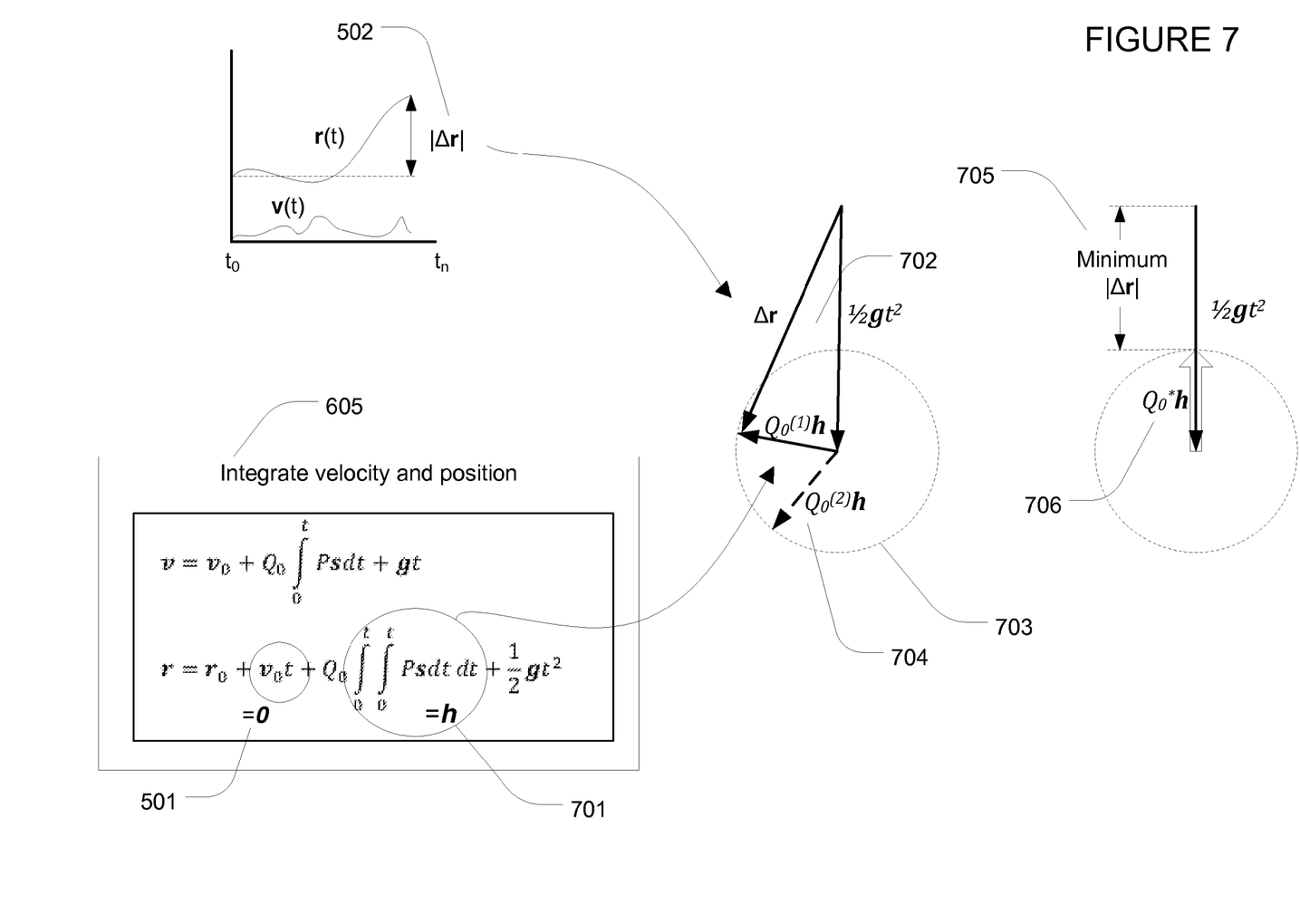
FIG. 7 further illustrates the technique of FIG. 6, showing an embodiment of the method that obtains a direct solution for the initial orientation estimate.

FIG. 7 illustrates a technique used in one or more embodiments to use the expressions of 605 along with the particular position penalty metric 502 ($|\Delta r|$) to directly calculate the initial orientation $Q_0$ that minimizes the penalty metric. Using the simplification 501 that $v_0=0$, and defining auxiliary variable h at 701, where $h=\int_0^t \int_0^t Psdt \, dt$, yields expression $$\Delta r = Q_0 h + \frac{1}{2}gt^2.$$

This expression is diagrammed at 702, with value $Q_0^{(1)}$ for the initial orientation. Since $Q_0$ is an orthogonal transform, the range of possible values $Q_0 h$ must lie on a sphere with radius $|h|$. A two-dimensional view of this sphere is shown as circle 703. A rotation of $Q_0^{(1)}h$ to $Q_0^{(2)}h$ is shown in 704; in all cases $Q_0 h$ is on 703. To minimize $|\Delta r|$ it is therefore apparent geometrically that $Q_0 h$ must point in the direction of $-g$, yielding optimal value 706 and minimum $|\Delta r|$ at 705. This technique provides the optimal $Q_0^*$ only up to an arbitrary rotation around g, reflecting the inability of a pure inertial sensor to sense heading. In other embodiments of the invention, other sensor data such as magnetometer data may be used to estimate initial heading as well.

Figure 8:
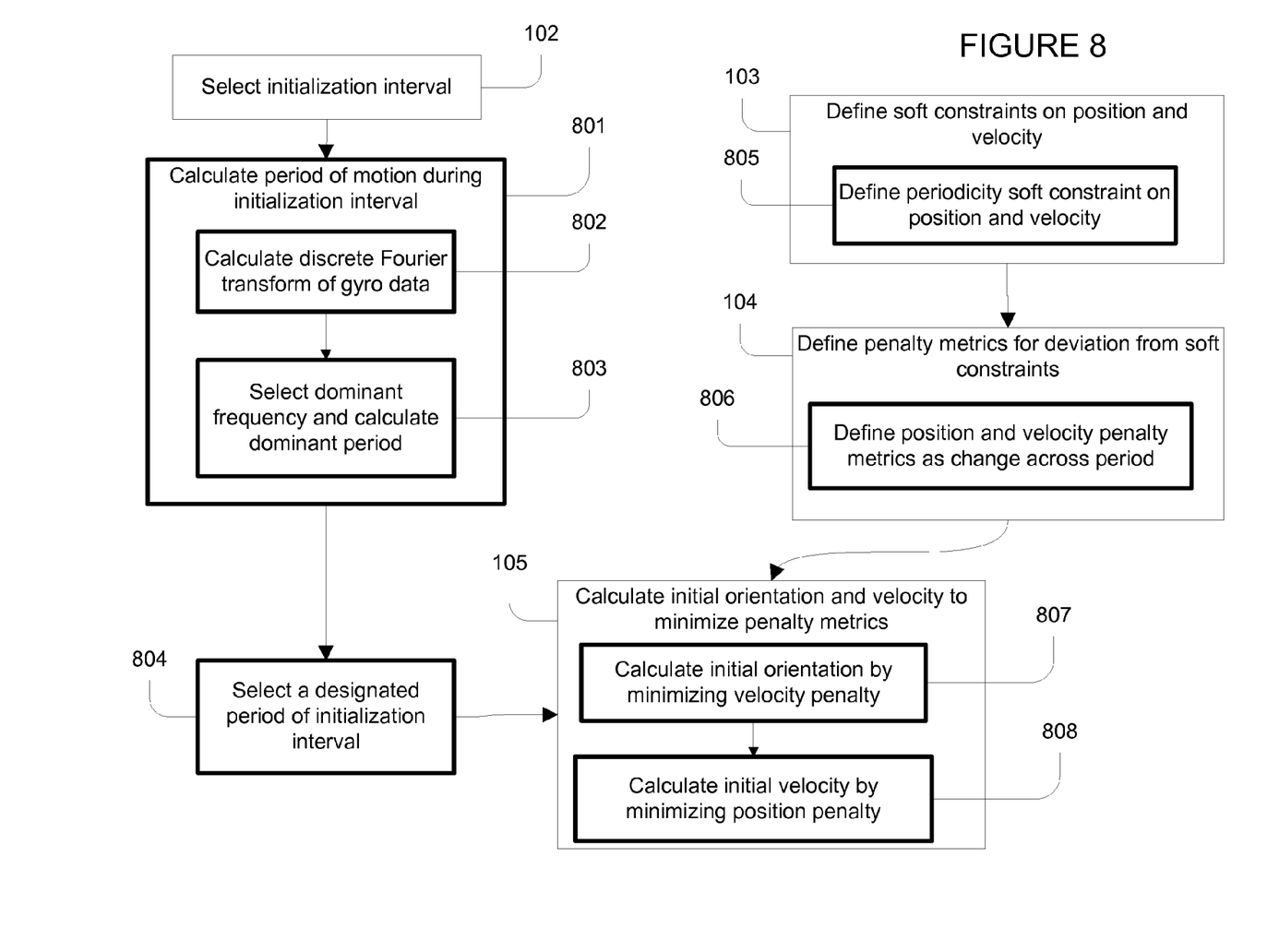
FIG. 8 shows a flowchart of an embodiment of the method that applies a soft constraint to position and velocity requiring periodic motion during the initialization interval, and uses a discrete Fourier transform to estimate the period of this periodic motion.

FIG. 8 illustrates a flow chart for an embodiment of the invention that uses a soft constraint requiring that the motion of the inertial sensor be approximately periodic during the initialization interval. The definition of soft constraints 103 includes defining periodicity constraints at 805 for the velocity and position of the inertial sensor during the initialization interval. Corresponding to the periodicity soft constraints, the definition of penalty metrics 104 includes metrics at 806 that measure the change in position and change in velocity over a single period as the penalty metrics. An initialization interval is selected at 102, and an estimate for the period of motion during this interval is calculated at 801. This period calculation is performed by transforming the time series of the sensor gyro data into the frequency domain via a discrete Fourier transform at 802, and selecting the dominant frequency from the transformed data at 803. A particular time interval within the initialization interval of length equal to the period is selected at 804. The penalty metrics 806 are minimized at 105 in two stages: First the initial orientation estimate is calculated to minimize the velocity penalty metric at 807, and then the initial velocity estimate is calculated to minimize the position penalty metric at 808. Other embodiments of the invention may employ a subset of these techniques; for example, the same velocity and position penalty metrics could be used, but time-domain techniques could be used instead of Fourier transforms to estimate the period of motion.

Figure 9:
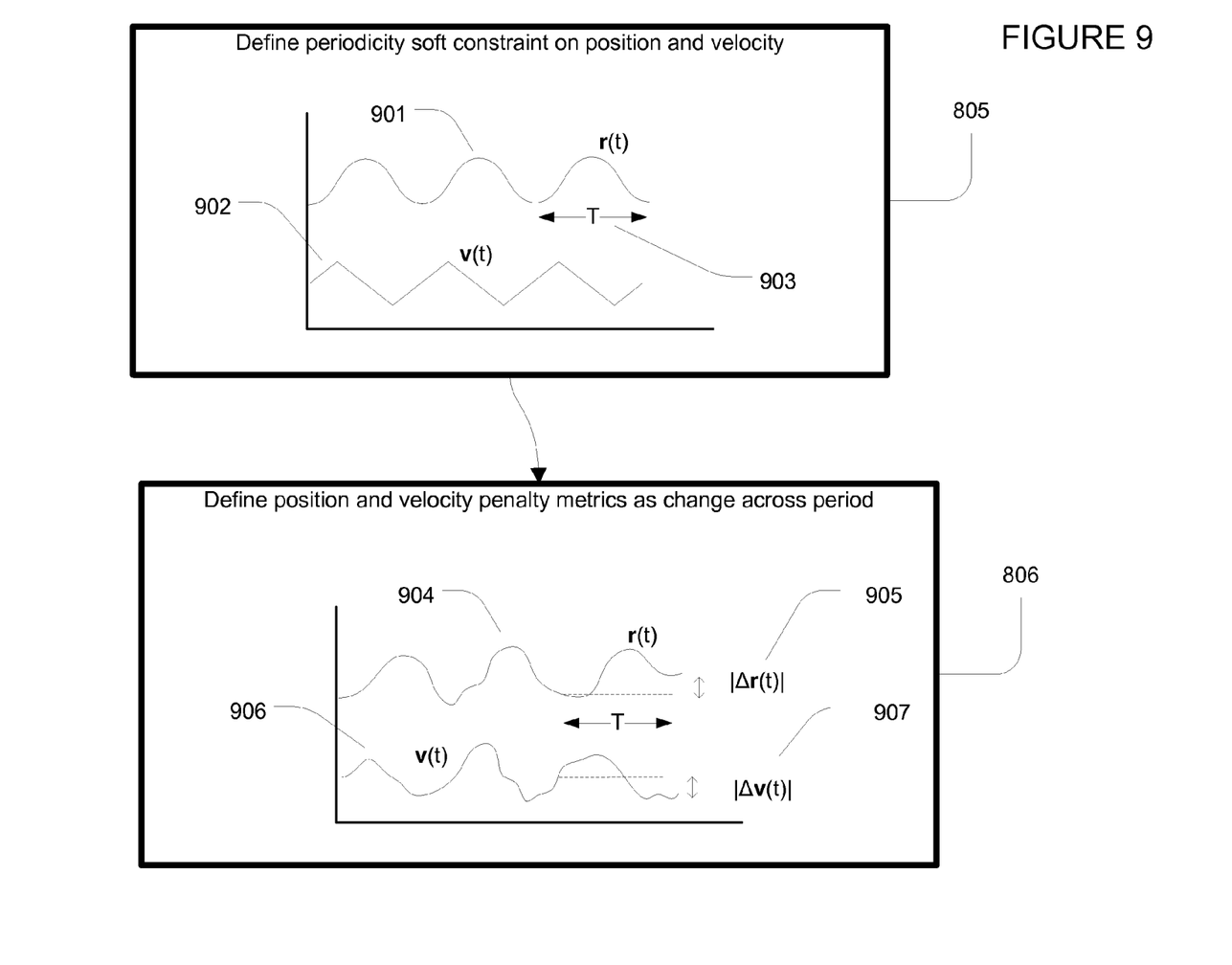
FIG. 9 shows a detailed view of two of the steps of FIG. 8, illustrating the periodicity constraint and the definition of penalty metrics for deviation from this periodicity constraint.

FIG. 9 provides a detailed view of the definition of periodicity soft constraints 805 and the definition of position and velocity penalty metrics 806. At 805 the soft constraints require that the position 901 (denoted r(t)) and the velocity 903 (denoted v(t)) be periodic with some period 903 (denoted T). These soft constraints only require periodic motion; they do not specify the period or the shape of the position and velocity curves. At 806 calculated position 904 and calculated velocity 906 are not precisely periodic. Position penalty metric 905 measures the deviation from exact periodicity as the absolute value of the change in position over one period, $|\Delta r|=|r(t+T)-r(t)|$. Similarly velocity penalty metric 907 measures the deviation from exact periodicity as the absolute value of the change in velocity over one period, $|\Delta v|=|v(t+T)-v(t)|$.

Figure 10:
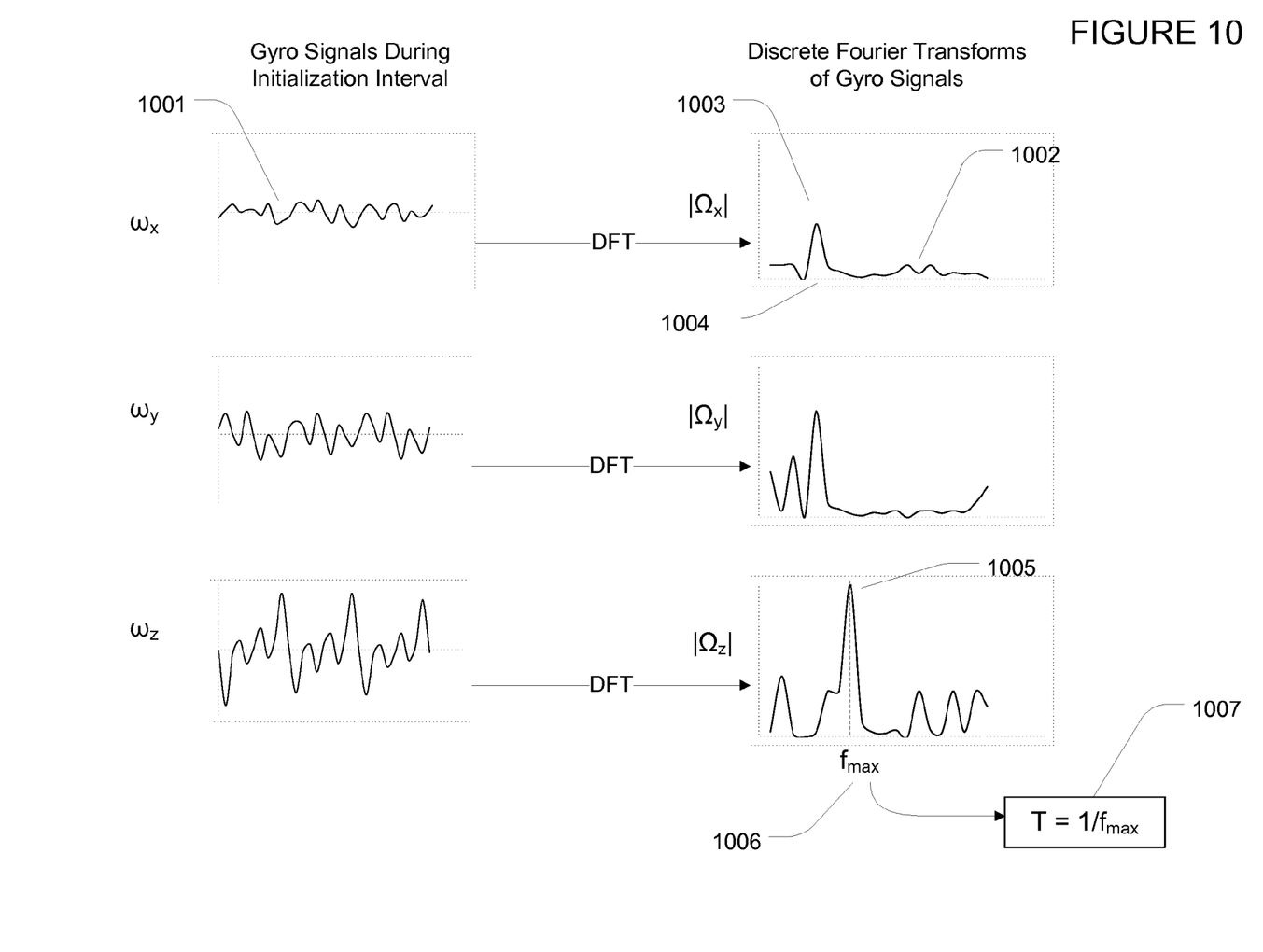
FIG. 10 shows a detailed view of two more of the steps of FIG. 8, illustrating the use of the discrete Fourier transform to calculate the dominant period during the initialization interval.

FIG. 10 provides a detailed view of the calculation of the period of motion 801. Time domain rate gyro data w(t) during the initialization interval, including time series 1001 for the gyro x-axis, $w_x$, and similar time series for $w_y$ and $w_z$, are transformed to the frequency domain using discrete Fourier transforms. The magnitude of the transformed $w_x$, 1002, denoted $|\Omega_x|$, is scanned for its peak value. The peak value 1003 occurs at frequency 1004. Similar scans of the magnitudes $|\Omega_y|$ and $|\Omega_z|$ are performed to find the peak values on these axes and the frequencies at which these peak values occur. The largest peak magnitude across the three axes is selected at 1005 (shown on the z-axis for illustration), and the frequency 1006, denoted $f_{max}$, at which this peak occurs is used as the overall dominant frequency for the motion during initialization. The dominant period is then calculated at 1007 as $T=1/f_{max}$.

Figure 11:
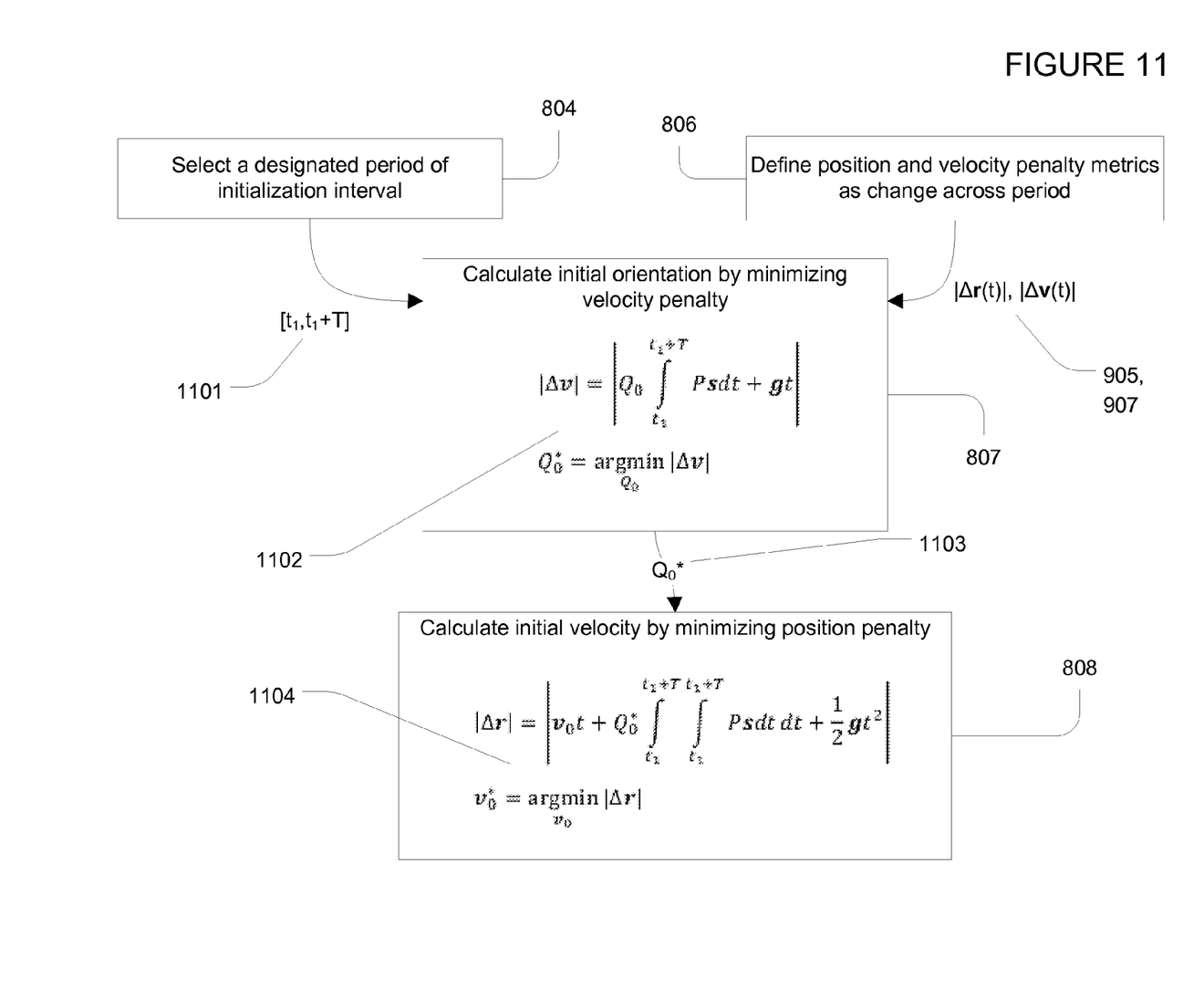
FIG. 11 shows a detailed view of an embodiment of the final two steps of FIG. 8, illustrating calculation of the optimal initial orientation estimate first, followed by calculation of the optimal initial velocity estimate.

FIG. 11 provides a detailed view of calculating the initial orientation estimate at 807 and calculating the initial velocity estimate at 808. An interval 1101 of length T found in 804, denoted $[t_1, t_1+T]$, is used for the calculations. The penalty metrics 905 and 907 are minimized sequentially. Using the technique described above and illustrated in FIG. 6, expression 1102 is obtained yielding $|\Delta v|=Q_0 \int_{t_1}^{t_1+T} Psdt+gt|$ for the velocity penalty metric. This expression can be minimized yielding initial orientation estimate $Q_0^*$, using the geometric technique illustrated in FIG. 7, or using any other well-known technique for numerical optimization. The initial orientation estimate 1103 is used in the subsequent calculation at 808. Again the integration technique illustrated in FIG. 6 is used to obtain expression 1104, yielding $$|\Delta r| = \left| v_0 t + Q_0^* \int_{t_1}^{t_1+T}\int_{t_1}^{t_1+T} Psdtdt + \frac{1}{2}gt^2 \right|.$$

This expression now depends on only a single unknown, $v_0$, since $Q_0^*$ has been calculated previously. This expression for $|\Delta r|$ can now be minimized to yield the estimate $v_0^*$ for initial velocity, using any well-known technique for numerical optimization.

What is claimed is:

1. A method for determining an estimate of the initial orientation $Q_0$ and initial velocity $v_0$ of an inertial sensor, comprising the steps:
    collecting sample data from an inertial sensor over a capture time interval $[t_i, t_f]$ that includes an activity of interest, said sample data including accelerometer data s(t) and rate gyro data w(t);
    selecting an initialization interval $[t_0, t_n] \subset [t_i, t_f]$ within said capture time interval;
    defining a set of soft constraints $\{C_i\}$ on the position r(t) and velocity v(t) of said inertial sensor during said initialization interval, where each $C_i \subset \{r:[t_0, t_n] \to \mathbb{R}^3\} \times \{v: [t_0, t_n] \to \mathbb{R}^3\}$, where said soft constraints represent approximations of typical patterns of position and velocity trajectories for said activity of interest during said initialization interval;
    defining penalty metrics $m_j(r(t), v(t))$ to quantify the deviation of calculated trajectories of said position r(t) and said velocity v(t) from said soft constraints $\{C_i\}$; and
    calculating estimates of the initial orientation $Q_0=Q(t_0)$ and initial velocity $v_0=v(t_0)$ of said inertial sensor at the start of said initialization interval to minimize said penalty metrics when said initial orientation and initial velocity are used as initial conditions to integrate said sample data into orientation, position and velocity over said initialization interval via the coupled differential equations $$\frac{dQ}{dt} = Q\omega^x, \frac{dv}{dt} = Qs + g, \frac{dr}{dt} = v.$$

2. The method of claim 1, further comprising:
    including among said soft constraints a requirement that the change in position between the start and end of said initialization interval be zero, $r(t_n)=r(t_0)$;
    setting said estimate of initial velocity to zero, $v(t_0)=0$; and
    including among said penalty metrics the absolute value of the difference in position between the end of said initialization interval and the start of said initialization interval, $m(r(t),v(t))=|r(t_n)-r(t_0)|$.

3. The method of claim 1, further comprising:
    including among soft constraints a requirement that the position and velocity of said inertial sensor be periodic during said initialization interval;
    calculating frequency domain signals for each axis of the rate gyro by applying a discrete Fourier transform to the corresponding axis of the rate gyro data time series during said initialization interval, $\Omega_x(f)=\text{DFT}(w_x(t)), \Omega_y(f)=\text{DFT}(w_y(t)), \Omega_z(f)=\text{DFT}(w_z(t))$;

selecting the dominant frequency $f_{max}$ as the frequency with the largest transform magnitude across the 3 axes, $f_{max}=\text{argmax}(\max(|\Omega_x(f)|, |\Omega_y(f)|, |\Omega_z(f)|))$, and calculating the dominant period T from said dominant frequency as $T=1/f_{max}$;
    including among said penalty metrics a velocity penalty metric that is the absolute value of the change in velocity over one period of motion, $m_v(r(t), v(t))=|v(t+T)-v(t)|$, and a position penalty metric that is the absolute value of the change in position over one period of motion, $m_r(r(t), v(t))=|r(t+T)-r(t)|$;
    selecting a designated period within said initialization interval, $[t_1, t_1+T] \subset [t_0, t_n]$, for calculation of said estimates of initial velocity and initial orientation;
    calculating said estimate of initial orientation by minimizing said velocity penalty metric over said designated period; and
    calculating said estimate of initial velocity by minimizing said position penalty metric over said designated period, using said estimate of initial orientation.

* * * * *